United States Patent [19]

Nishida et al.

[11] 4,241,366
[45] Dec. 23, 1980

[54] MAGNETIC HEAD LOADING APPARATUS

[75] Inventors: Hiroshi Nishida, Kanagawa; Kazuo Nakagoshi, Odawara; Jun Naruse, Odawara; Kunihiro Motoyoshi, Odawara, all of Japan

[73] Assignee: Hitachi, Ltd., Japan

[21] Appl. No.: 9,688

[22] Filed: Feb. 5, 1979

[30] Foreign Application Priority Data

Feb. 16, 1978 [JP] Japan .................................. 53/15957

[51] Int. Cl.³ .............................................. G11B 5/54
[52] U.S. Cl. .................................................. 360/105
[58] Field of Search ........................................ 360/105

[56] References Cited

U.S. PATENT DOCUMENTS

| | | | |
|---|---|---|---|
| 3,864,749 | 2/1975 | Stansell | 360/105 |
| 3,990,106 | 11/1976 | Kameyama et al. | 360/105 |
| 4,005,485 | 1/1977 | Opocensky | 360/105 |

*Primary Examiner*—Robert S. Tupper
*Attorney, Agent, or Firm*—Craig and Antonelli

[57] ABSTRACT

A magnetic head loading apparatus serves to load a magnetic head on the surface of a disc-shaped magnetic recording medium rotating continuously so as to perform the recording and reproduction of data. The magnetic head is shifted from unload to load position by means of a drive means. In order to prevent damage to the recording medium due to the collision of the magnetic head with the recording medium, the drive means is so controlled as to cause the magnetic head to decellerate as the magnetic head approaches the load position.

7 Claims, 11 Drawing Figures

MAGNETIC HEAD LOADING APPARATUS

BACKGROUND OF THE INVENTION

This invention relates to a magnetic head loading apparatus for loading and unloading magnetic heads on and from a magnetic recording medium, especially a magnetic disc.

The papers entitled "IBM Series/1 4964 Diskette Unit and Attachment Feature Theory Diagrams" published by IBM Corporation in 1977, discloses a conventional example of this kind of apparatus.

Among random access memory devices, there is a memory device called "Floppy Disc" using as a recording medium a flexible disc coated with magnetic material. The floppy disc memory apparatus using such a floppy disc has one or plural magnetic heads mounted in gimbal structure and data is recorded or reproduced by loading the magnetic heads on the floppy disc. When recording or reproduction is not executed, the magnetic heads are disposed at a distance from the surface of the recording medium, i.e. in the unload position, while they are shifted to the load position allowing them to be urged against the surface of the recording medium if the recording or reproducing operation is required.

Usually, the head load time (the time required for the head to move from unload to load position) must be as short as not more than 50 msec. One of the measures to reduce the head load time is to increase the speed at which the head is shifted from unload to load position. With that mechanism, however, since the speed of the head dashing against the recording medium is very high, there is caused a risk that the surface of the recording medium is damaged by the collision impact. For the recording medium there may be used a flexible material such as a Mylar sheet (polyethylene terephthalate film) coated with magnetic material. A solenoid is usually used to shift the magnetic head from unload to load position. It has a mechanical characteristic that the mechanical force it generates on a plunger member is minimum at the start of energization and maximum at the end of its movement. The magnetic head designed to be driven by a solenoid gains acceleration after the energization of the solenoid at the unload position and accelerates until it reaches the load position, colliding there at its maximum speed. This increases the chance of the magnetic recording medium being damaged and worn off.

Another method for shortening the head load time is to make the unload and load positions very close to each other. With this geometry, the head shift speed can be slowed down so that the collision impact can be moderated and damage to the medium surface can be prevented. However, this method also has a drawback. For the very close distance between the magnetic head and the magnetic recording medium may cause accidental collisions between them due to the vibrations caused by external disturbances and/or the vibrations of the motor for rotating the recording medium even if the head is stationary in the unload position. This adverse collision contact may also cause damage to the recording medium with considerably high probability.

The present trend is toward the adoption of the last method with an attempt to solve the inherent problem.

SUMMARY OF THE INVENTION

The object of this invention is to provide a magnetic head loading apparatus having a short head load time and being capable of preventing damage to the magnetic recording medium.

According to this invention, the magnetic heads are supported by a supporting member and the supporting member is shifted from unload position to load position by means of a shifting member. The shifting member shifts the supporting member in such a manner that the speed of the magnetic head decreases as it approaches the surface of the recording medium, that is, to the load position. Accordingly, the speed of collision of the magnetic head with the recording medium is lessened so that the damage to the recording medium can be prevented. Further, the magnetic head is moved at high speeds till it approaches the load position so that a short head load time can be obtained without making the load and the unload positions so close to each other. Moreover, since the distance between the load and the unload positions can be made relatively large, the risk that the head in the unload position collides with the recording medium owing to vibrations, will be lowered.

DESCRIPTION OF THE PREFERRED EMBODIMENTS

Figure 1:
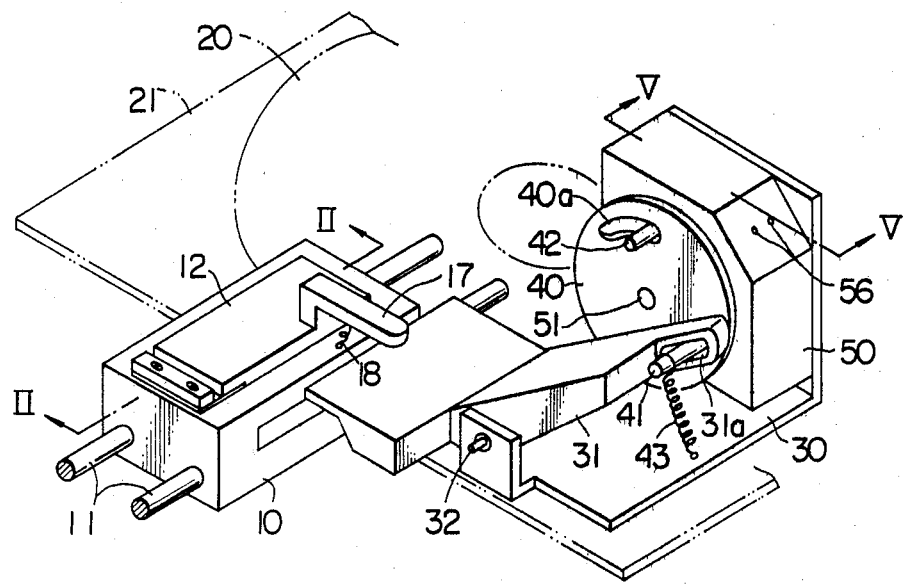
FIG. 1 shows in perspective view a magnetic head loading apparatus as one embodiment of this invention, with its magnetic head kept in the load position.
Figure 2:
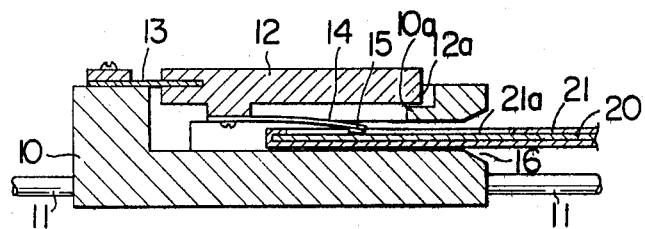
FIG. 2 is a cross section taken along line II—II in FIG. 1.
Figure 3:
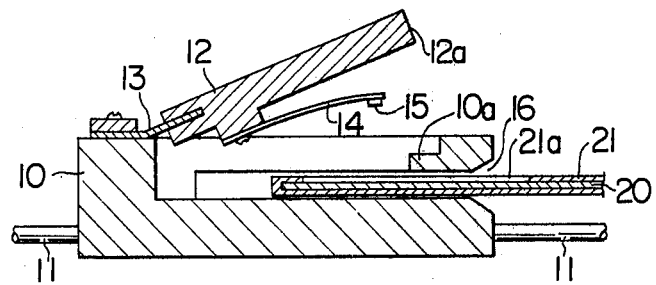
FIG. 3 shows in cross section a magnetic head loading apparatus as shown in FIG. 1, with its magnetic head kept in the unload position.

As shown in FIGS. 1, 2 and 3, a carriage 10 is slidably supported on a pair of guide bars 11 and can be moved along the guide bars 11. The guide bars 11 are fixedly attached to a casing frame (not shown). The driving mechanism for moving the carriage 10, which is not directly related to this invention, is here omitted and not shown. A load block 12 is attached to the carriage 10 by means of a plate spring 13 and supports a magnetic head 15 by means of a head spring 14. The carriage 10 thus formed has a recess 16 through which a disc-shaped recording medium 20 encased in a jacket 21 is inserted. The jacket 21 has an opening 21a through which the recording medium 20 is exposed. An L-shaped arm 17 is integrally formed on the load block 12. A spring 18 has its one end anchored to the carriage 10 and the other end to the arm 17, so that the arm 17 and therefore the load block 12 is urged toward the recording medium 20.

FIG. 2 shows the load condition in which the load block 12 is in the load position, that is, the load block 12 is prevented from moving further toward the recording medium since the end 12a of the load block 12 abuts against the protrusion 10a of the carriage 10. The magnetic head 15 is urged against the surface of the recording medium by means of the elastic force of the head spring 14 when the recording or the reproduction of data is executed. It is not always-necessary to keep the magnetic head 15 in contact with the medium surface but the head 15 may be floated on the recording medium 20, with a very small gap therebetween, by the air flow generated by the rotation of the medium.

FIG. 3 shows the unload condition wherein the load block 12 is in the unload position. In this unload condition, the carriage 10 is allowed to move along the guide bars 11 so as to suitably locate the magnetic head 15 at the selected position on the recording medium 20.

Figure 4A:
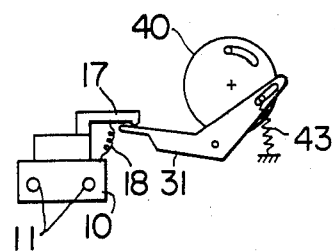
FIG. 4A shows the principal mechanism set in the unload condition.
Figure 4B:
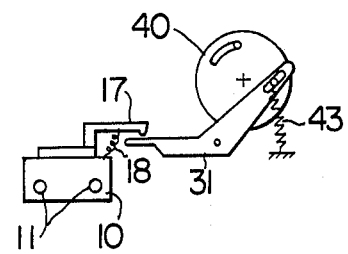
FIG. 4B shows the principal mechanism set in the load condition.

As shown in FIG. 1, a link 31 is swingably supported on a shaft 32 attached to a base 30. One end of the link 31 extends under the arm 17. An electromagnetic rotary drive apparatus 50 is attached to the base 30 and a disc 40 is rigidly fixed to the rotary shaft 51 of the drive apparatus 50. A pin 41 is erected on the disc 40 and engaged with a slot 31a cut in the other end of the link 31. An arcuate slot 40a is cut in the disc 40 and a stopper pin 42 provided on the side wall of the drive apparatus 50 extends through the arcuate slot 40a so as to limit the angular movement of the disc 40. A spring 43 has its ends anchored respectively to the base 30 and the pin 41. When the drive apparatus 50 is not operating, the disc 40 is rotated clockwise as seen in FIG. 1 by the compressive force of the spring 43 until it is stopped when the further end of the arcuate slot 40a abuts against the stopper pin 42. As shown in FIG. 4A, therefore, the link 31 is swung clockwise to lift the arm 17 and therefore the head block 12, which is then kept in the unload position. When the drive apparatus 50 is operated by supplying current therefor, the disc 40 is rotated counterclockwise against the urging force of the spring 43 by means of the drive apparatus 50. Accordingly, as shown in FIG. 4B, the link 31 is swung counterclockwise so that the head block 12 is brought into the load position by the compressive force of the spring 18.

Figure 5:
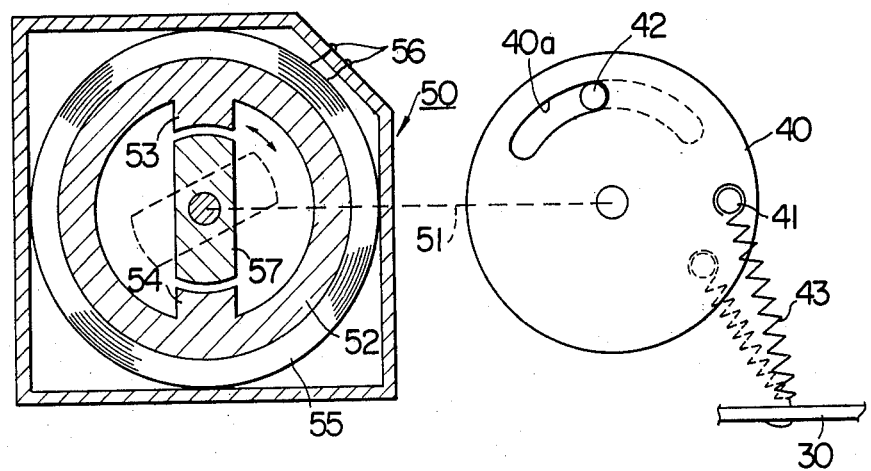
FIG. 5 is a cross section taken along line V—V in FIG. 1, with associated parts accompanying.

FIG. 5 shows in detail the electromagnetic rotary drive apparatus 50 and the disc 40. The drive apparatus 50 has a cylindrical stator 52 around which a coil 55 is wound, the coil 55 having a pair of terminals 56 to which a voltage is applied. The stator 52 has salient poles 53 and 54 which form magnetic poles of opposite polarity when the coil 55 is energized. The rotary shaft 51 has a rotor 57 as an operating member attached thereto. Without supply of power to the coil 55, that is, in the now-operating condition, the rotor 57 is stationary in the position depicted by broken line, owing to the compressive force of the spring 43. When the coil 55 is energized, the rotor 57 rotates counterclockwise since attractive force is generated between the salient poles 53 and 54 of the stator 52 and the outer ends of the rotor 57 in order to decrease reluctance. The rotor 57 is stopped in the position depicted in FIG. 5 by solid line, wherein the magnetic poles of the rotor 57 are aligned with those of the stator 52. As apparent already from the above description, the position designated by the broken line, in which the rotor 57 is kept, corresponds to the unload position of the head block and the position depicted by the solid line to the load position.

Figure 6:
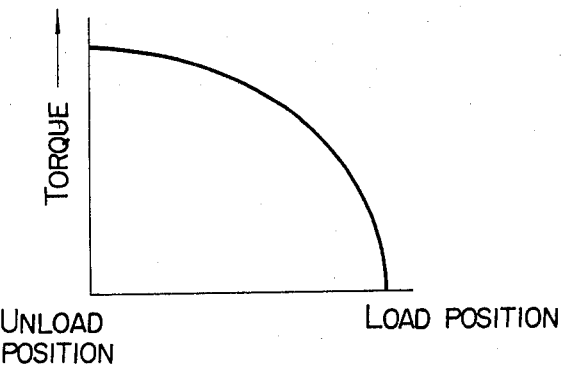
FIG. 6 shows the torque characteristic of the electromagnetic drive apparatus used in this invention.

FIG. 6 shows the torque characteristic of the electromagnetic rotary drive apparatus 50 shown in FIG. 5. The torque varies from a maximum value at the unload position to a minimum value of zero at the load position. Namely, the torque varishes when the magnetic poles of the rotor 57 come closest to the magnetic poles of the stator 52.

Figure 7A:
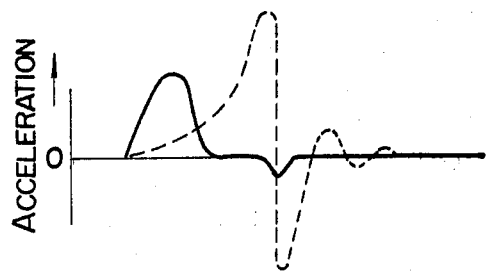
FIGS. 7A, 7B and 7C respectively show the associated acceleration, speed and voltage characteristics.
Figure 7B:
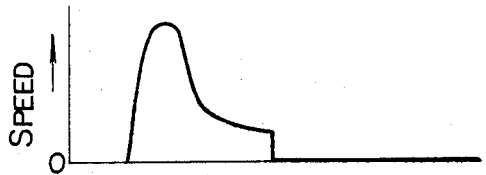
Figure 7C:
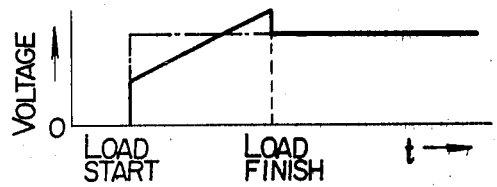

FIG. 7 shows the waveforms of the angular acceleration and speed of the rotor 57 and the voltage applied to the coil 55, varying from the instant of load start to the instant of load finish. The angular acceleration and speed of the rotor 57 correspond to the acceleration and speed of the load block. According to the torque characteristic shown in FIG. 6, the speed of the load block 12 becomes maximum soon after the load start and then gradually falls toward the instant of the load finish. Accordingly, the magnetic head is brought into contact with the magnetic recording medium at a very low speed so that damage to the recording medium due to collision impact can be prevented. Further, since the load block 12 is moved at a rather high speed immediately after the load start, a comparatively short head load time can be obtained even though there is an appreciable distance between the unload and load positions. The voltage applied to the coil 55 is so controlled as to have a ramp waveform sloping gradually up to the instant of the load finish. This choice of the ramp waveform is for the purpose of preventing the speed of the load block from becoming too high immediately after the load start. If the apparatus is so designed as to prevent the load block from taking an abnormally high speed, a rectangular waveform designated by broken line in FIG. 7C may be employed instead of the ramp waveform. The waveform indicated by broken line in FIG. 7A is of the acceleration taken by a conventional apparatus.

Figure 8:
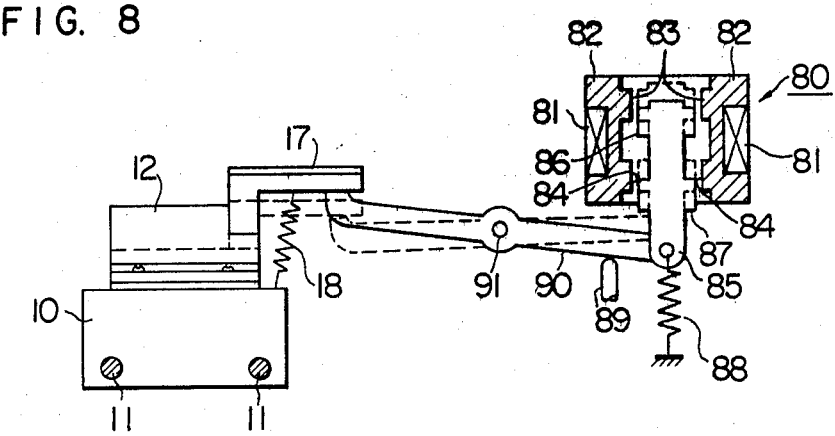
FIG. 8 shows a magnetic head loading apparatus as another embodiment of this invention.

FIG. 8 shows an electromagnetic linear drive apparatus used also as another embodiment in this invention. In FIG. 8, a carriage 10, a load block 12, an arm 17 etc. are similar to those shown in FIG. 1. An electromagnetic linear drive apparatus 80 comprises a stator 82 with a coil 81 wound thereabout and plunger 85 sliding up and down in the hollow space of the stator 82. The plunger 85 is normally urged downward by a spring 88. The stator 82 has projections 83 and 84 serving as magnetic poles provided on the inner wall thereof and the plunger 85 is also provided with protrusions 86 and 87 serving as magnetic poles opposite to the projections 83 and 84 of the stator 82. The right hand end of a link 90, which is swingably supported on a shaft 91, is pivotally connected with the plunger 85.

When the coil 81 is energized, the stator 82 is magnetized to cause the projections 83 and 84 of the stator 82 to attract the protrusions 86 and 87 so that the plunger 85 comes to rest in the position indicated by a broken line in FIG. 8. Accordingly, the link 90 interlocked with the plunger 85 is brought to rest in the position designated also by broken line so that the load block 12 is shifted to the load position. When the coil 81 is deenergized, the stator 82 is demagnetized so that the plunger 85 and the link 90 are returned to their normal position by the contractive force of the spring 88, the link 90 abutting against a stopper as shown in FIG. 8. Namely, when the coil 81 is energized and deenergized alternately, the plunger 85 reciprocates between the position where the link 90 abuts against the stopper 89 and the position depicted by the broken line. The relationship between the position of the plunger 85 and the torque of the link 90 very much resembles the torque characteristic shown in FIG. 6. Namely, the torque of the link 90 varies from the maximum value at the unload position where the link 90 abuts against the stopper 89, to zero in the load position where the link 90 and the plunger 85 comes to rest as indicated by broken lines in FIG. 8. Accordingly, the speed of the magnetic head at the time of load finish can be made so low that damage to the recording medium due to collision with the magnetic head can be avoided. Further, since the speed of the magnetic head moving after the load start can be made high, the space between the magnetic head and the recording medium in the unload condition can be made rather large without increasing the head load time over a predetermined length. Therefore, damage to the recording medium due to external disturbances can be prevented.

We claim:

1. A magnetic head loading apparatus for loading a magnetic head on the surface of a disc-shaped recording medium rotating continuously, said magnetic head loading apparatus comprising supporting means for supporting said magnetic head and being moveable between a load position, where said magnetic head performs recording on said recording medium or reproduction from said medium, and an unload position, where said head is retracted from said recording medium; and a means for shifting said supporting means from said unload position to said load position in such a manner that the speed of said magnetic head is lowered as said magnetic head moves closer to said surface of said recording medium.

2. A magnetic head loading apparatus for loading a magnetic head on the surface of a disc-shaped recording medium rotating continuously and for unloading said head from said surface, said apparatus comprising a supporting means for supporting said magnetic head and being movable between a load position, where said magnetic head is to perform recording in said recording medium or reproduction from said medium, and an unload position, where said head is retracted from said recording medium;

a first urging means for urging said supporting means toward said load position;

drive means interlocked with said supporting means and movable between a first position for putting said supporting means in the unload position and a second position for putting said supporting means in the load position, the speed of said supporting means being lowered as said drive means moves from said first position toward said second position;

a second urging means for urging said drive means toward said first position;

wherein in the unload position said drive means is urged to said first position against the urging force of said first urging means by said second urging means, while in the load position said drive means is shifted from said first position to said second position against the urging force of said second urging means; and wherein said supporting means is shifted by the urging force of said first urging means from said unload position to said load position as said drive means moves from said first position to said second position.

3. A magnetic head loading apparatus for loading a magnetic head on the surface of a disc-shaped recording medium rotating continuously and for unloading said head from said surface, said magnetic head loading apparatus comprising a supporting means for supporting said magnetic head for movement between a load position, where said magnetic head is to perform recording in said recording medium or reproduction from said medium, and an unload position where said head is kept apart from said medium;

an electromagnetic drive means having a stator, a drive member and an urging means for urging said drive member to a first position, said drive member being shifted from said first position to a second position against the urging force of said urging means when said electromagnetic drive means is actuated, and the force to drive said driving member becoming weaker as said member moves from said first position toward said second position; and a means for transferring the movement of said electromagnetic drive means to said supporting means, serving to shift said supporting means from said unload position to said load position as said drive member moves from said first position to said second position.

4. A magnetic head loading apparatus as claimed in claim 3, wherein said electromagnetic means further includes therein a shaft for rotatably support said drive member and said drive member rotates through the angular range defined between said first and second positions.

5. A magnetic head loading apparatus as claimed in claim 3, wherein said drive member is linearly reciprocated between said first and second positions.

6. A magnetic head loading apparatus as claimed in claim 3, 4 or 5, wherein each of said stator and said drive members has at least a pair of magnetic poles and the magnetic poles of said drive members are caused to approach the corresponding magnetic poles stator as said drive member moves from said first to said second position.

7. A magnetic head loading apparatus as claimed in claim 6, wherein the gaps between the opposite magnetic poles of said stator and said drive member become minimum when said drive member takes said second position.

* * * * *